(12) United States Patent
Sandulescu et al.

(10) Patent No.: US 10,291,165 B2
(45) Date of Patent: May 14, 2019

(54) METHOD AND DEVICE FOR DETECTING THE PRESENCE OF A PERMANENT MAGNET OF A ROTOR OF A SYNCHRONOUS MACHINE

(71) Applicant: ABB Schweiz AG, Baden (CH)

(72) Inventors: Paul Sandulescu, Västerås (SE); Giovanni Zanuso, Västerås (SE); Luca Peretti, Järfälla (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/801,866

(22) Filed: Nov. 2, 2017

(65) Prior Publication Data

US 2018/0167010 A1   Jun. 14, 2018

(30) Foreign Application Priority Data

Dec. 13, 2016  (EP) ..................... 16203880

(51) Int. Cl.
*H02P 21/00* (2016.01)
*H02P 21/32* (2016.01)
*H02P 1/46* (2006.01)
*H02P 21/18* (2016.01)

(52) U.S. Cl.
CPC .............. *H02P 21/32* (2016.02); *H02P 1/46* (2013.01); *H02P 21/18* (2016.02)

(58) Field of Classification Search
CPC ............ H02P 21/32; H02P 21/18; H02P 1/46
USPC .................................................. 318/400.02
See application file for complete search history.

(56) References Cited

U.S. PATENT DOCUMENTS

| 2004/0190101 | A1* | 9/2004 | Hayashi | ................. G02F 2/004 359/237 |
| 2008/0018296 | A1* | 1/2008 | Hashimoto | ............. H02P 21/05 318/807 |
| 2009/0028532 | A1* | 1/2009 | El-Antably | ............... H02P 6/10 388/819 |
| 2010/0264861 | A1 | 10/2010 | Basic et al. | |

(Continued)

FOREIGN PATENT DOCUMENTS

| CN | 104158456 A | 11/2014 |
| CN | 104201998 A | 12/2014 |

OTHER PUBLICATIONS

Feuersänger et al., Initial Rotor Position Identification in Medium Voltage Synchronous Machines. IECON 2012, Oct. 25-28, 2012, Montreal, QC, Canada 1852-1857 6 pages.

*Primary Examiner* — Eduardo Colon Santana
*Assistant Examiner* — Gabriel Agared
(74) *Attorney, Agent, or Firm* — Whitmyer IP Group, LLC

(57) ABSTRACT

A method of detecting a permanent magnet rotor of a synchronous machine, includes: injecting a voltage waveform to the stator windings of the synchronous machine, measuring two phase currents in the stator winding, transforming the two phase currents to a rotor reference frame to obtain a current waveform, sampling the current waveform to obtain positive and negative portion values, constructing first and second periodic waveforms by using the sampled positive and negative portion values, performing a frequency analysis of a first and second spectrums of the periodic waveforms, and determining whether a permanent magnet is present in the synchronous machine based on the spectrums.

19 Claims, 8 Drawing Sheets

(56) References Cited

U.S. PATENT DOCUMENTS

2011/0163707 A1* 7/2011 Lendenmann .......... H02P 21/00
                                                    318/452
2012/0229119 A1   9/2012 Leidhold
2014/0145655 A1*  5/2014 Peretti .................... H02P 21/14
                                                    318/400.02

* cited by examiner

METHOD AND DEVICE FOR DETECTING THE PRESENCE OF A PERMANENT MAGNET OF A ROTOR OF A SYNCHRONOUS MACHINE

TECHNICAL FIELD

The present disclosure generally relates to synchronous machines. In particular, it relates to methods and devices for synchronous machine commissioning.

BACKGROUND

In a typical electrical machine control algorithm, at drive power-up, the initial electrical rotor position is not known and a dedicated identification algorithm has to be used. The initial electrical rotor position is an important control parameter that allows a controlled operation at zero speed without reverse rotor rotation or over-speed fault.

The standstill solutions found in literature are mainly divided into two categories: (1) transient excitation tests, also known as pulse tests, which use a number of consecutive voltage pulses applied, in an open-loop manner, to consecutive phases of the electrical machine. The pulses are applied for a given amount of time. At the end of each voltage pulse, phase current samples are taken. The phase current samples are used to evaluate the electrical rotor position and the permanent magnet (PM) flux polarity. (2) High-frequency signal injection methods, which are more advanced and have better accuracy relative to the pulse methods. However, they require additional signal processing techniques and waveform analysis.

The two main ways of implementation of a high-frequency signal injection methods use either rotating injection or pulsating injection techniques. In the case of the rotating injection method, a high-frequency sinusoidal voltage vector rotating at constant speed is applied to the electrical machine. The measured carrier current is processed and the electrical rotor position and magnet polarity information are transmitted as a phase modulation between the injected rotating voltage and the measured rotating current response.

For the pulsating injection method, a randomly orientated high-frequency sinusoidal pulsating voltage vector is applied in the rotor reference frame of the electrical machine. The electrical rotor position and permanent magnet flux polarity information are extracted as an amplitude modulation of the estimated rotor reference frame carrier current response.

The solutions proposed in literature are commonly developed on particular electrical machines and lack a generalized approach. As a result, when applied on different electrical machines, these solutions require algorithm modifications, tuning of certain parameters of the algorithm or identifying various machine dependent parameters. This is a major drawback since this identification algorithm is applied during drive start-up when only basic information of the electrical machine is available: nominal current, nominal voltage and nominal frequency. Furthermore, some solutions proposed in the literature require the use of a rotor position feedback device. However, for some applications, such a device is too costly or has a negative influence on the reliability of the drive and therefore is omitted. As a consequence, some proposed methods found in literature cannot be applied to industrial drives.

In the case of the pulse tests (1), a brief problem statement is the duration of application of the voltage pulse. This is critical when standstill operation is mandatory. As a result, the pulse duration is typically determined a priori through experimental tests and then stored in the memory of the drive associated with the respective electrical machine.

In the case of the high-frequency injection methods (2), there is a need of prior tuning of some parameters used for the current regulation or for the position and permanent magnet flux polarity demodulation algorithm. Additionally, the high-frequency signal injection methods are sensible to the saliency ratio value, a machine specific parameter. The demodulation algorithm for the electrical rotor position can be unstable if it is not designed for a specific saliency ratio, which can be typically greater or lower than one, therefore a specific machine design. Furthermore, a machine with a saliency ratio close to one may lead to electrical position identification failure.

US20100264861 discloses a method for determining the position of the flux vector of an electric motor which is driven by a variable speed drive. The method is achieved without a speed or position sensor, and is based on the detection of an error in the estimated position of the flux vector by using a low-frequency current injection. The method includes injecting a first current vector into a first injection reference frame rotating at a first frequency relative to a reference frame synchronous with the rotation of the motor, and a second current vector into a second injection reference frame rotating at a second frequency opposite to the first frequency, a step of determining a first stator flux induced voltage delivered at the output of a first integrator module synchronous with the first reference frame and a second stator voltage delivered at the output of a second integrator module synchronous with the second reference frame, a step of regulating the position of the rotor flux vector by minimizing the error, between a real position and an estimated position of the rotor flux vector, the error being determined based on the second induced voltage.

According to US20100264861 the rotor has to be moved at least a few degrees back and forth because it requires the generation of a back electromotive force. For certain industrial application rotor movement is however not allowed during the parameter identification.

SUMMARY

An object of the present disclosure is to provide a method of detecting the presence of a permanent magnet of a rotor of a synchronous machine which solves or at least mitigates the problems of the prior art.

There is hence according to a first aspect of the present disclosure provided a method of detecting the presence of a permanent magnet of a rotor of a synchronous machine, wherein the method comprises: providing an injection of a voltage waveform to the stator windings of the synchronous machine, obtaining a measurement of two phase currents in the stator winding generated due to the injection of the voltage waveform, transforming the two phase currents to a rotor reference frame to obtain a current waveform in the rotor reference frame, sampling the positive portion of a cycle of the current waveform to obtain sampled positive portion values and the negative portion of a cycle of the current waveform to obtain sampled negative portion values, constructing a first periodic waveform by using the sampled positive portion values and a second periodic waveform by using the sampled negative portion values, performing a frequency analysis of a first spectrum of the first periodic waveform and a second spectrum of the second periodic waveform, and determining whether a permanent magnet is present in the synchronous machine based on the first spectrum and on the second spectrum.

The axis of the highest reluctance may be obtained in a number of ways, for example by the method according to the fourth aspect presented herein, or using one of the methods (1) and (2) presented in the background section.

By means of the method according to the first aspect presented herein the presence of a permanent magnet in the rotor of the synchronous machine may be determined, without any prior knowledge of the synchronous machine type.

The construction of the first periodic waveform may be performed by using the sampled positive portion values for the positive portion of a cycle of the first periodic waveform and using the sampled positive portion values with negative sign to obtain the negative portion of a cycle of the first periodic waveform.

The construction of the second periodic waveform may be performed by using the sampled negative portion values for the negative portion of a cycle of the second periodic waveform and using the sampled negative portion values with negative sign to obtain the positive portion of a cycle of the second periodic waveform.

According to one embodiment the determining is based on a harmonic distortion of the first periodic waveform obtained from the first spectrum and on a harmonic distortion of the second periodic waveform obtained from the second spectrum.

According to one embodiment, in case the harmonic distortion of the first periodic waveform and of the second periodic waveform is the same, it is determined that no permanent magnet is present in the rotor of the synchronous machine.

Thus, in case the harmonic distortion is essentially equal for the first periodic waveform and the second periodic waveform, it can be determined that no permanent magnet is present. This can be derived from the fact that if a permanent magnet is present, the saturation in the iron core of the synchronous machine will be non-homogenous which would be reflected in differing spectra, in particular on the amount of harmonic distortion of the two periodic waveforms analysed. If no such difference can be detected, it can be concluded that no permanent magnet is present in the rotor of the synchronous machine. The synchronous machine may in this case for example be a synchronous reluctance machine.

According to one embodiment, in case the harmonic distortion of the first periodic waveform is higher than the harmonic distortion of the second periodic waveform, it is determined that the rotor of the synchronous machine has a permanent magnet and that the north pole of the permanent magnet is in the first direction.

There is hence a higher degree of saturation in the iron core of the synchronous machine in the direction of the highest reluctance, meaning that the north pole of the magnet is oriented in this direction.

According to one embodiment, in case the harmonic distortion of the second periodic waveform is higher than the harmonic distortion of the first periodic waveform, it is determined that the rotor of the synchronous machine has a permanent magnet and that the north pole of the permanent magnet is in a direction opposite to the first direction.

There is hence a higher degree of saturation in the iron core of the synchronous machine in the direction opposite to the first direction of the axis of highest reluctance, i.e. at 180 degrees from the first direction, meaning that the north pole of the magnet is oriented at 180 degrees from the first direction.

According to one embodiment the voltage waveform has a frequency and amplitude which causes saturation in an iron core of the synchronous machine. In this manner, it is possible to obtain phase currents influenced by the saturation, which in the rotor reference frame provides the information in the spectra of the first periodic waveform and the second periodic waveform which is necessary to determine whether a permanent magnet is present, and to determine the north pole of the permanent magnet.

One embodiment comprises generating a pulsating voltage waveform in a first direction along an axis of highest reluctance in a rotor reference frame, wherein in step the voltage waveform is based on the pulsating voltage waveform.

There is according to a second aspect of the present disclosure provided a computer program comprising computer-executable components which when executed by processing circuitry of a permanent magnet detector causes the permanent magnet detector to perform the method according to the first aspect.

There is according to a third aspect of the present disclosure provided a permanent magnet detector for detecting the presence of a permanent magnet of a rotor of a synchronous machine, the permanent magnet detector comprising: processing circuitry, and a storage medium comprising computer-executable components which when run on the processing circuitry causes the permanent magnet detector to: provide an injection of a voltage waveform to the stator windings of the synchronous machine, obtain a measurement of two phase currents in the stator winding generated due to the injection of the sinusoidal voltage waveform, transform the two phase currents to a rotor reference frame to obtain a current waveform in the rotor reference frame, sample the positive portion of a period of the current waveform to obtain sampled positive portion values and the negative portion of a period of the current waveform to obtain sampled negative portion values, construct a first periodic waveform by using the sampled positive portion values and a second periodic waveform by using the sampled negative portion values, perform a frequency analysis of a first spectrum of the first periodic waveform and of a second spectrum of the second periodic waveform, and determine whether a permanent magnet is present in the synchronous machine based on the first spectrum and on the second spectrum.

According to one embodiment the permanent magnet detector is configured to determine whether a permanent magnet is present in the synchronous machine based on a harmonic distortion of the first periodic waveform obtained from the first spectrum and on a harmonic distortion of the second periodic waveform obtained from the second spectrum.

According to one embodiment the permanent magnet detector is configured to determine that no permanent magnet is present in the rotor of the synchronous machine in case the harmonic distortion of the first periodic waveform and of the second periodic waveform is the same.

According to one embodiment the permanent magnet detector is configured to determine that the rotor of the synchronous machine has a permanent magnet and that the north pole of the permanent magnet is in the first direction in case the harmonic distortion of the first periodic waveform is higher than the harmonic distortion of the second periodic waveform.

According to one embodiment the permanent magnet detector is configured to determine that the rotor of the synchronous machine has a permanent magnet and that the north pole of the permanent magnet is in a direction opposite to the first direction in case the harmonic distortion of the second periodic waveform is higher than the harmonic distortion of the first periodic waveform.

According to one embodiment the permanent magnet detector is configured to generate a voltage waveform that has a frequency and amplitude which causes saturation in an iron core of the synchronous machine.

According to one embodiment the permanent magnet detector is configured to generate a pulsating voltage waveform in a first direction along an axis of highest reluctance in a rotor reference frame, wherein the permanent magnet detector is configured inject the voltage waveform to the stator windings of the synchronous machine based on the pulsating voltage waveform.

There is according to a fourth aspect of the present disclosure provided a method of determining an electrical rotor position of a rotor of a synchronous machine, wherein the method comprises: a) generating a pulsating sinusoidal voltage waveform in a second direction in an estimated rotor reference frame, b) providing an injection of a sinusoidal voltage waveform, based on the pulsating sinusoidal waveform in the second direction in the estimated rotor reference frame, applied to the stator windings of the synchronous machine, c) obtaining a measurement of two phase currents in the stator winding generated due to the injection of the sinusoidal voltage waveform, d) transforming the two phase currents to a stator reference frame to obtain a first stator reference frame current component and a second stator reference frame current component, e) determining a first current envelope associated with the amplitude and phase of the fundamental harmonic of the first stator reference frame component and a second current envelope associated with the amplitude and phase of the fundamental harmonic of the second stator reference frame component, f) determining an estimated angle between the second direction and the stator reference frame based on the first current envelope and the second current envelope, g) adjusting the second direction based on the estimated angle, and repeating steps b) to g) utilising the pulsating sinusoidal waveform with the second direction as adjusted for providing an injection of the sinusoidal waveform, until a predetermined criterion has been fulfilled, and h) determining the orientation of a highest reluctance path relative to the stator reference frame by means of the estimated angle obtained in the iteration of steps b) to g) when the criterion has been fulfilled, the highest reluctance path coinciding with an axis of an actual rotor reference frame of the synchronous machine, and providing an indication of the electrical rotor position.

The electrical rotor position is the mechanical rotor position multiplied by the number of pole pairs of the synchronous machine.

The method is able to provide robust initial electrical rotor identification for various synchronous machines including highly nonlinear electrical machines that are emerging on the market. The proposed solution is furthermore generic and independent on the machine type. Additionally, electrical rotor position determination may be provided also in a standstill condition and requires no regulation.

According to one embodiment in step e) the estimated angle is determined by applying the four quadrant inverse tangent function on the first current envelope and the second current envelope.

According to one embodiment the criterion is that a difference between two estimated angles obtained in subsequent iterations of steps b) to f) is less than a predetermined value.

According to one embodiment the criterion is a predetermined amount of iterations of steps b) to f) or a predetermined amount of time that the iterations of steps b) to f) are to be performed.

According to one embodiment the rotor reference frame is in the direct-quadrature coordinate system.

There is according to a fifth aspect of the present disclosure provided a computer program comprising computer-executable components which when executed by processing circuitry of an electrical rotor position determination system causes the electrical rotor position determination system to perform the method according to the first aspect.

There is according to a sixth aspect of the present disclosure provided an electrical rotor position determination system for determining an electrical rotor position of a rotor of a synchronous machine, wherein the electrical rotor position determination system comprises: processing circuitry, and a storage medium comprising computer-executable components which when run on the processing circuitry causes the electrical rotor position determination system to: a) generate a pulsating sinusoidal voltage waveform in a second direction in an estimated rotor reference frame, b) provide an injection of a sinusoidal voltage waveform, based on the pulsating sinusoidal waveform in the second direction in the estimated rotor reference frame, applied to the stator windings of the synchronous machine, c) obtain a measurement of two phase currents in the stator winding generated due to the injection of the sinusoidal voltage waveform, d) transform the two phase currents to a stator reference frame to obtain a first stator reference frame current component and a second stator reference frame current component, e) determine a first current envelope associated with the amplitude and phase of the fundamental harmonic of the first stator reference frame component and a second current envelope associated with the amplitude and phase of the fundamental harmonic of the second stator reference frame component, f) determine an estimated angle between the second direction and the stator reference frame based on the first current envelope and the second current envelope, g) adjust the second direction based on the estimated angle, and repeating b) to f) utilising the pulsating sinusoidal waveform with the second direction as adjusted for providing an injection of the sinusoidal waveform, until a predetermined criterion has been fulfilled, and h) determine the orientation of a highest reluctance path relative to the stator reference frame by means of the estimated angle obtained in the iteration of steps b) to g) when the criterion has been fulfilled, the highest reluctance path coinciding with an axis of an actual rotor reference frame of the synchronous machine, and providing an indication of the electrical rotor position.

According to one embodiment the processing circuitry is configured to determine the estimated angle by applying the four quadrant inverse tangent function on the first current envelope and the second current envelope.

According to one embodiment the criterion is that a difference between two estimated angles obtained in subsequent iterations of b) to f) is less than a predetermined value.

According to one embodiment the criterion is a predetermined amount of iterations of b) to f) or a predetermined amount of time that the iterations of b) to f) are to be performed.

According to one embodiment the rotor reference frame is in the direct-quadrature coordinate system.

According to a seventh aspect of the present disclosure there is provided a method of identifying a type of a synchronous machine provided with a permanent magnet, wherein the method comprises: generating a pulsating voltage waveform in a direction orthogonal to an axis of highest reluctance in a rotor reference frame, providing an injection of a voltage waveform by means of a power converter, based on the pulsating waveform orthogonal to the axis of highest reluctance, applied to the stator windings of the synchronous machine, wherein in case the power converter saturates or a ratio between an amplitude of the voltage waveform when injected orthogonal to the axis of highest reluctance and an amplitude of a voltage waveform when injected along the axis of highest reluctance differs substantially from 1 it is determined that the synchronous machine is an Interior Permanent Magnet Synchronous Machine (IPMSM), otherwise that the synchronous machine is a Surface Permanent Magnet Synchronous Machine (SPMSM).

With substantial is here meant at least a 15% difference from 1.

One embodiment comprises obtaining a polarity of the permanent magnet, and based on the polarity of the permanent magnet and on a positive peak value and a negative peak value of a voltage waveform in a rotor reference frame, obtained by providing an injection of a voltage waveform along an axis of highest reluctance, determining whether the IPMSM is a classic IPMSM or that the IPMSM is a PMaSynRM.

There is according to an eighth aspect of the present disclosure provided a synchronous machine identifier for identifying a type of a synchronous machine provided with a permanent magnet, comprising processing circuitry, and a storage medium comprising computer-executable components which when run on the processing circuitry causes the synchronous machine identifier to generate a pulsating voltage waveform in a direction orthogonal to an axis of highest reluctance in a rotor reference frame, provide an injection of a voltage waveform by means of a power converter, based on the pulsating waveform orthogonal to the axis of highest reluctance, applied to the stator windings of the synchronous machine, wherein in case the power converter saturates or a ratio between an amplitude of the voltage waveform when injected orthogonal to the axis of highest reluctance and an amplitude of a voltage waveform when injected along the axis of highest reluctance differs substantially from 1 the synchronous machine identifier is configured to determine that the synchronous machine is an Interior Permanent Magnet Synchronous Machine (IPMSM), otherwise that the synchronous machine is a Surface Permanent Magnet Synchronous Machine (SPMSM).

According to one embodiment the synchronous machine identifier is configured to obtain a polarity of the permanent magnet, and based on the polarity of the permanent magnet and on a positive peak value and a negative peak value of a voltage waveform in a rotor reference frame, obtained by providing an injection of a voltage waveform along an axis of highest reluctance, to determine whether the IPMSM is a classic IPMSM or that the IPMSM is a PMaSynRM.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

Figure 1:
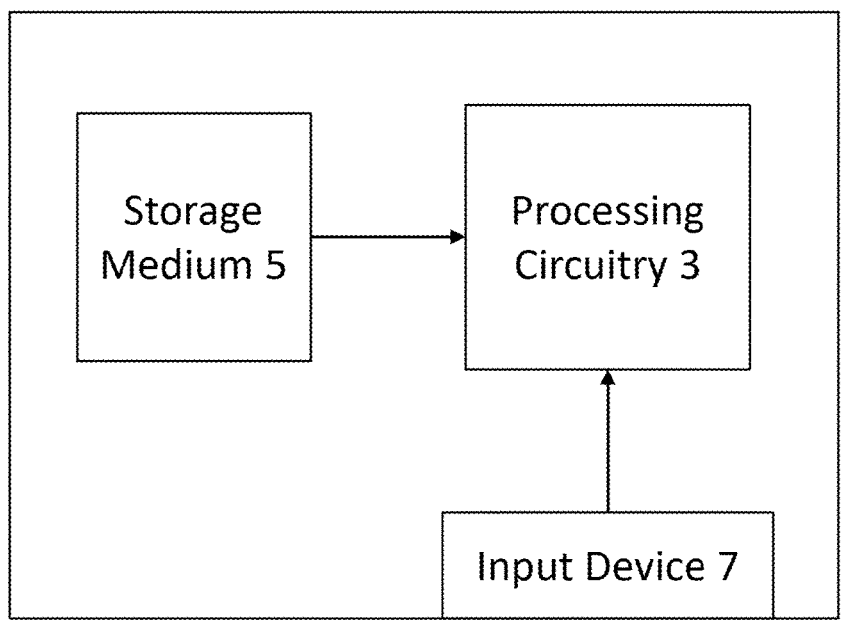
FIG. 1 is a block diagram of an example of an electrical rotor position determination system.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

One aspect of the present disclosure relates to a method of determining an electrical rotor position of a rotor of a synchronous machine. The electrical rotor position of the synchronous machine is determined by determining the highest reluctance path, which coincides with the electrical rotor position. The highest reluctance path is not an axis, i.e. it does not have a direction, but it is rather a line extending through the origin of an actual or true rotor reference frame, having an orientation with respect to a stator reference frame of the synchronous machine. This aspect may or may not be linked to a further aspect of this disclosure relating to the detection of a permanent magnet and the polarity/direction of the north pole of the permanent magnet in case it is detected that the synchronous machine has a magnet.

Although the electrical rotor position, i.e. the highest reluctance path, is a component necessary for determining the existence and polarity of a permanent magnet, the electrical rotor position may be determined in other alternative ways than described herein, as for example disclosed in US2010264861 A1 or in the paper "Initial Rotor Position Identification in Medium Voltage Synchronous Machines" by Feuersänger et al., published in IECON 2012-38$^{th}$ Annual Conference on IEEE Industrial Electronics Society, or by other know methods as for example described in the background section.

Another aspect of this disclosure deals with the identification of the type of synchronous machine. This identification is based on knowledge of the highest reluctance path, and on knowledge of the polarity of the permanent magnet. Again, the highest reluctance path may be obtained by means of the aspect relating to the determining of the electrical rotor position, or by other methods, as for example mentioned above.

The aspect relating to the electrical rotor position will be described first and involves generating a pulsating sinusoidal waveform in an estimated rotor reference frame, i.e. a rotating coordinate system such as a direct-quadrature coordinate system. The pulsating sinusoidal waveform is generated in a second direction in the estimated rotor reference frame. This second direction may be an arbitrarily selected direction, or it may be a predetermined direction. The pulsating sinusoidal waveform is transformed from the estimated rotor reference frame to a sinusoidal waveform in a three-phase reference frame. The sinusoidal waveform is applied to the stator windings of a synchronous machine. Phase currents generated in the stator windings due to the application of the sinusoidal waveform to the stator windings are obtained from measurements, and transformed to a stator reference frame whereby a first stator reference frame current component and a second stator reference frame current component are obtained.

A first current envelope associated with the amplitude and phase of the fundamental harmonic of the first stator reference frame component and a second current envelope associated with the amplitude and phase of the fundamental harmonic of the second stator reference frame component is determined, and an estimated angle between the stator reference frame and the second direction is obtained based on the first current envelope and the second current envelope. The second direction is adjusted based on the estimated angle and the steps described above are repeated. For each iteration of the steps, the latest adjusted second direction forms the basis for the generation of the sinusoidal waveform applied to the stator windings. The iterations proceed until a predetermined criterion has been fulfilled. The second direction may for example be adjusted utilising the difference between the two latest subsequent estimated angles. A rotation corresponding to the difference may for example be applied to the previous value of the second direction to rotate the pulsating sinusoidal waveform in the estimated rotor reference frame. In this manner, the second direction will be rotated for each iteration and the second direction will converge towards one of the, at this point not known, axes of the actual rotor reference frame of the synchronous machine, which coincides with the highest reluctance path or line.

With reference to FIG. 1, an example of an electrical rotor position determination system is shown. Electrical rotor position determination system 1 is configured to determine the electrical position of a rotor of a synchronous machine and comprises processing circuitry 3, a storage medium 5 operatively connected to the processing circuitry 3, and an input unit 7 configured to receive measurement values of phase currents of stator windings and provide these to the processing circuitry 3.

The processing circuitry 3 uses any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning electrical rotor position determination.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. The storage medium 5 comprises computer-executable components which when run on the processing circuitry 3 causes electrical rotor position determination system 1 to perform the steps of the method of determining an electrical rotor position as disclosed herein.

Figure 2:
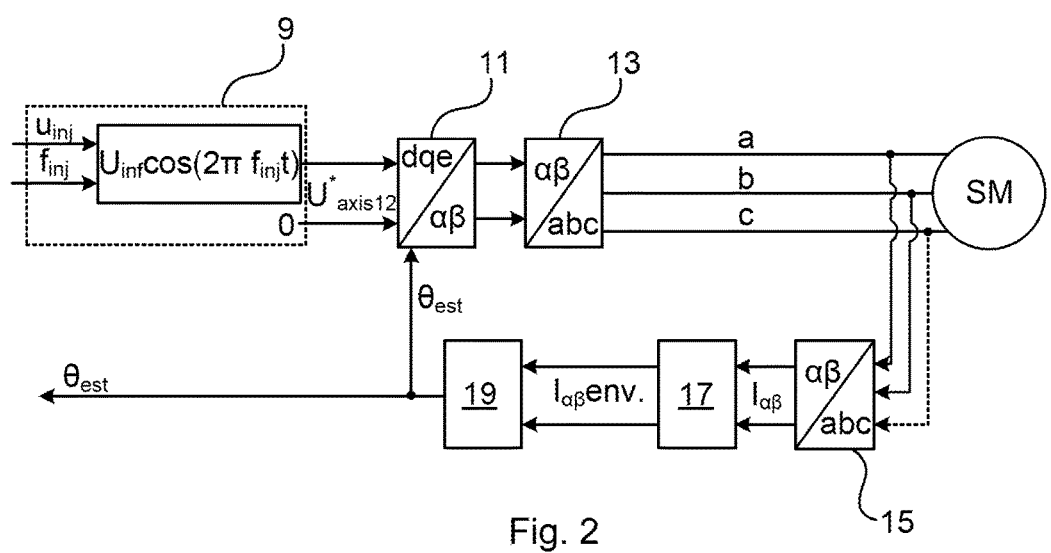
FIG. 2 is a block diagram of various blocks that may be implemented by the electrical rotor position determination system for determining an electrical rotor position of a rotor of a synchronous machine.

FIG. 2 shows a block diagram which illustrates examples of logical blocks of the electrical rotor position determination system 1 that can be used for determining the electrical rotor position of a synchronous machine SM by means of the electrical rotor position determination system 1. Any computational blocks in FIG. 2 are realised by means of the processing circuitry 3.

According to the example in FIG. 2, a voltage reference block 9 is configured to generate a pulsating sinusoidal waveform having a frequency $\omega_{inj}$ and an amplitude $U_{inj}$ in an estimated rotor reference frame. In particular, the voltage reference block 9 is configured to generate the pulsating sinusoidal waveform in a second direction in the estimated rotor reference frame. The estimated rotor reference frame is for example in the direct-quadrature (d, q) coordinate system.

The pulsating sinusoidal waveform is transformed by a first transformation block 11 from the estimated rotor reference frame to a stator reference frame, which is fixed to the stator of the synchronous machine SM.

In a second transformation block 13 the rotating sinusoidal waveform obtained from the first transformation block 11 is transformed to a three-phase reference frame. A sinusoidal waveform based on the pulsating sinusoidal waveform generated by voltage reference block 9 is thus applied to the stator windings of the synchronous machine SM. The sinusoidal waveform is typically applied to the stator windings by means of an inverter, typically a voltage source converter, connected between the second transformation block 13 and the synchronous machine SM, not shown in FIG. 2.

A third transformation block 15 is configured to transform two phase currents measured in the stator windings from the three-phase reference frame to the stator reference frame. In this manner a first stator reference frame component and a second stator reference frame component are obtained. The first stator reference frame component and the second stator reference frame component are processed by an envelope detector block 17. The envelope detector block 17 is configured to detect a first current envelope associated with the amplitude and phase of the fundamental harmonic of the first stator reference frame component and a second current envelope associated with the amplitude and phase of the fundamental harmonic of the second stator reference frame component.

An angle estimator block 19 is configured to determine an estimated angle $\theta_{est}$ between the second direction and the stator reference frame. The estimated angle $\theta_{est}$ is fed back to the first transformation block 11 whereby the second direction of the pulsating sinusoidal waveform is adjusted based on the estimated angle $\theta_{est}$. This process of applying a sinusoidal waveform to the stator windings and determining the estimated angle $\theta_{est}$ is repeated a number of times, and is thus repeated for a number of second directions which are adjusted based on the current estimated angle $\theta_{est}$. The estimated angle $\theta_{est}$ between the second direction and the stator reference frame will thereby converge towards one of the axes of the actual rotor reference frame of the synchronous machine as defined by the electrical position of the rotor.

Figure 3:
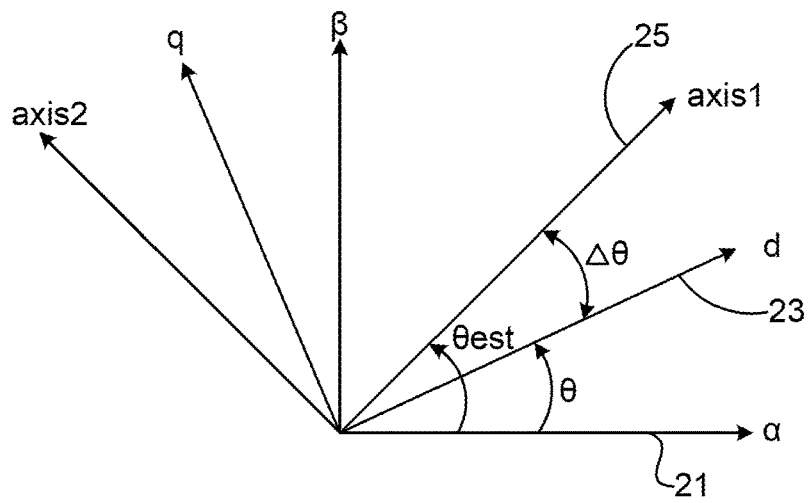
FIG. 3 is a graph illustrating the relation between the second direction which forms an axis of an estimated rotor reference frame, the actual rotor reference frame and the stator reference frame.

FIG. 3 shows stator reference frame 21 which is a two-phase quadrature reference frame fixed to the stator of the synchronous machine. The actual rotor reference frame 23 of the synchronous machine, which according to the example may have a fixed orientation relative to the stator reference frame 21, due to a standstill condition of the rotor, has a direct axis d and a quadrature axis q.

The second direction can be seen to form an axis of an estimated rotor reference frame 25 having an axis 1 and an axis 2, which is rotated towards the actual rotor reference frame 23 for each iteration of the method, i.e. each time an estimated angle $\theta_{est}$ is fed back to the first transformation block 11. In the example shown in FIG. 3, the estimated rotor reference frame 25 is rotated towards the actual rotor reference frame 23, and when the difference $\Delta\theta=\theta_{est}-\theta$ is small enough the second direction will coincide with one of the axes of the actual rotor reference frame 23, although without knowing the orientation of the actual rotor reference frame 23, i.e. without knowing whether the second direction is the positive or negative d-axis or positive or negative q-axis.

According to the example shown in FIG. 3 there is an indication of convergence between axis 1 of the estimated rotor reference frame 25 and the d-axis of the actual rotor reference frame 23, but it should be noted that this convergence could also be between axis 1 and the q-axis of the actual rotor reference frame 23; the axis of the actual rotor reference frame 23 towards which axis 1 converges depends on the underlying synchronous machine.

The highest reluctance path, or equivalently the lowest inductance path, which is determined by recursive adjustment of the second direction in which the pulsating sinusoidal waveform is generated by the voltage reference block 9 coincides with either the d-axis of q-axis of the actual rotor reference frame 23, depending on the type of synchronous machine. This axis of the actual rotor reference frame 23, the orientation of which is unknown at this point, may also be referred to as an axis of highest reluctance. The angle between the stator reference frame 21 and the actual rotor reference frame 23 is denoted by $\theta$. In case of permanent magnet presence in the synchronous machine, the determined highest reluctance path also coincides with the axis of the permanent magnet flux.

Although typically the actual rotor reference frame 23 is at a standstill when the method is carried out, it should be noted that it is possible to adapt the algorithm also for rotating rotors/rotor reference frames by compensating for the rotation in the calculations.

Figure 4:
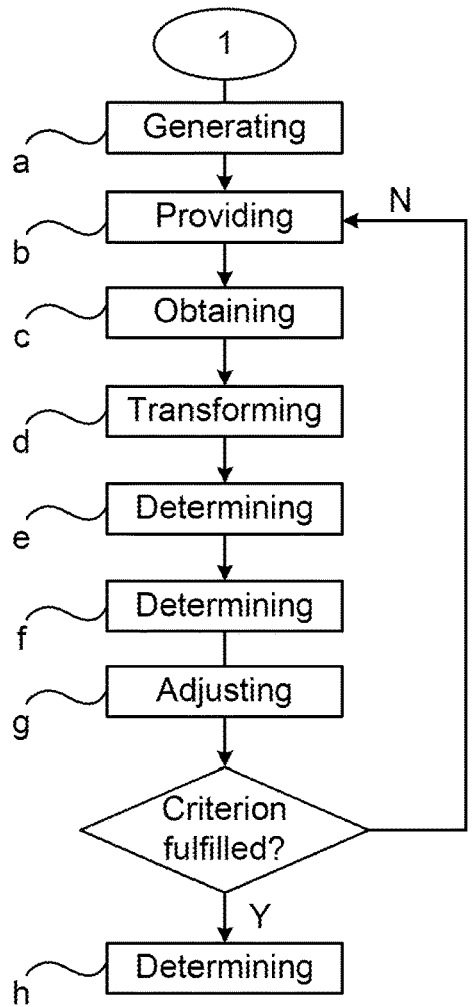
FIG. 4 is a flowchart of a method of determining an electrical rotor position of a rotor of a synchronous machine by means of the electrical rotor position determination system in FIG. 1.

A method of determining the electrical rotor position of a rotor of a synchronous machine, as performed by the electrical rotor position determination system 1 will now be described in more detail with reference to FIG. 4.

In a step a) a pulsating sinusoidal voltage waveform in a second direction in an estimated rotor reference frame is generated.

In a step b) an injection of a sinusoidal voltage waveform is provided, applied to the stator windings of the synchronous machine. The sinusoidal waveform is based on the pulsating sinusoidal waveform in the second direction in the rotor reference frame. As previously described, the sinusoidal waveform is obtained by transformations from the estimated rotor reference frame to the three-phase reference frame.

In a step c) a measurement of two phase currents in the stator winding generated due to the injection of the sinusoidal voltage waveform is obtained. The measurement of the two phase currents may for example be obtained from current sensors.

In a step d) the two phase currents are transformed to a stator reference frame to obtain a first stator reference frame current component and a second stator reference frame current component. In particular, the first stator reference frame current component may be $i_\alpha$ and the second stator reference frame current component may be $i_\beta$.

In a step e) a first current envelope associated with the amplitude and phase of the fundamental harmonic of the first stator reference frame component and a second current envelope associated with the amplitude and phase of the fundamental harmonic of the second stator reference frame component are determined. Although the injected voltage waveform is sinusoidal, the phase currents measured in step d) comprise a plurality of higher harmonics due to saturation/distortion. That is why the current envelopes of the fundamental harmonic are evaluated for the two stator reference frame components. The fundamental harmonic may be obtained by for example Discrete Fourier Transform (DFT) or by means of filtering.

The first current envelope $i_{\alpha envelope}$ and the second current envelope $i_{\beta envelope}$ may be expressed as follows when the electrical machine is at standstill and the resistance voltage drop and cross coupling effects are neglected:

$$i_{\alpha envelope} = r\cos(\theta-\varphi) \quad (1)$$

$$i_{\beta envelope} = r\sin(\theta-\varphi) \quad (2)$$

where $r = k_{\alpha,\beta}\sqrt{(\Sigma L)^2 + \Delta L - 2\Sigma L \Delta L \cos(2\Delta\theta)}$ and $$\Sigma L = \frac{L_{dd} + L_{qq}}{2}$$

and $L_{dd}$ and $L_{qq}$ are the inductances associated with the d-axis and the q-axis, respectively, $$\Delta L = \frac{L_{dd} - L_{qq}}{2}, \text{ and } k_{\alpha,\beta} = -\frac{U_{inj}}{L_{dd}L_{qq}\omega_{inj}}$$

and $\varphi = a\tan 2((\Delta L + \Sigma L)\sin(\Delta\theta), (\Delta L - \Sigma L)\cos(\Delta\theta))$, where a tan 2 is the four quadrant inverse tangent function.

In a step f) an estimated angle $\theta_{est}$ between the second direction and the stator reference frame is determined based on the first current envelope and the second current envelope.

In particular, according to one example, the estimated angle $\theta_{est}$ is determined by applying the four quadrant inverse tangent function on the first current envelope and the second current envelope. Hereto, the estimated angle $\theta_{est}$ may be obtained as follows:

$$\theta_{est} = a\tan 2(i_{\beta envelope}, i_{\alpha envelope}) = \theta - \varphi + n\pi, n\in Z \quad (3)$$

When the estimated angle $\theta_{est}$ is obtained the orientation of the actual rotor reference frame 23 relative to the stator reference frame 21 is of course not known, but by iteration the difference $\Delta\theta=\theta_{est}-\theta$ between two subsequent values of the estimated angle, i.e. $\Delta\theta=\theta_{estN}-\theta_{estN-1}$ can be made small or essentially zero, whereby the estimated angle $\theta_{est}$ converges towards the angle between the actual rotor reference frame 23 and the stator reference frame 21. Hereto, when a number of iterations have been performed the estimated angle $\theta_{est}$ between the second direction and the stator reference frame 21 will be equal to or essentially equal to the angle between the stator reference frame and the actual rotor reference frame, i.e. $\theta_{est}=\theta$.

In a step g) the second direction is adjusted based on the estimated angle, and steps b) to g) are repeated utilising the pulsating sinusoidal waveform with the second direction as adjusted for providing an injection of the sinusoidal waveform, until a predetermined criterion has been fulfilled.

The criterion may for example be that a difference between two estimated angles obtained in subsequent iterations of steps b) to f) is less than a predetermined value, i.e. $\Delta\theta=\theta_{estN}-\theta_{estN-1}$ is less than a predetermined value.

According to another example the criterion may be a predetermined amount of iterations of steps b) to f) or a predetermined amount of time that the iterations of steps b) to f) are to be performed.

In a step h) the orientation of a highest reluctance path relative to the stator reference frame 21 is determined by means of the estimated angle $\theta_{est}$ obtained in the iteration of steps b) to f) when the criterion has been fulfilled. Thus, when the criterion is fulfilled, the estimated angle thus obtained is selected to be the angle between the second direction and the stator reference frame 21, and the second direction will in this case coincide or essentially coincide with the one of the axes of the actual rotor reference frame 23. In this manner, the position of the rotor of the synchronous machine may be obtained.

It should be noted that by means of the method described above the second direction/axis 1 will upon convergence only provide an alignment with an axis of the actual rotor reference frame, which is the axis of highest reluctance, i.e. the axis which coincides with the highest reluctance. By aligning the second direction/axis 1 with the actual rotor reference frame, no information concerning the polarity of a potential permanent magnet has been obtained. The direction of the positive axis of axis 1 has not been determined at this point. This direction can be obtained by means of the method described below, which identifies the existence of, and orientation of a permanent magnet.

Figure 5:
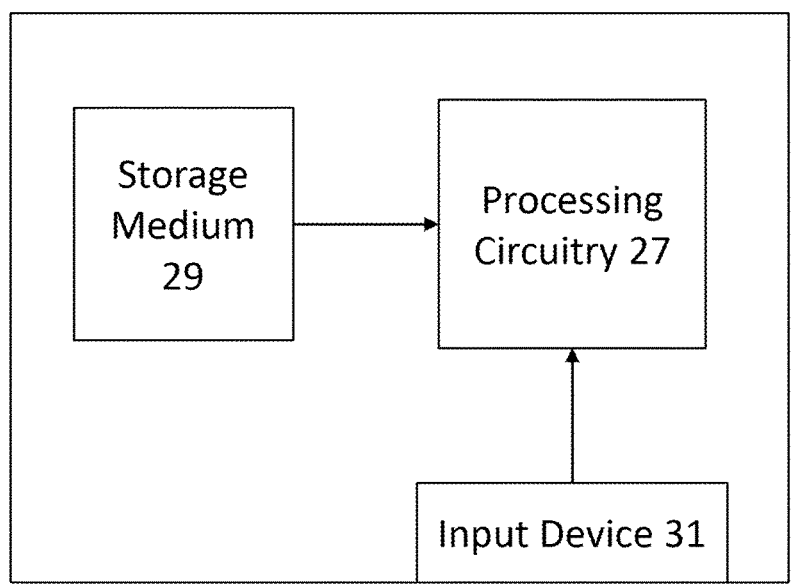
FIG. 5 depicts a block diagram of an example of a permanent magnet detector.

With reference to FIG. 5, an example of a permanent magnet detector is shown. Permanent magnet detector 26 is configured to detect the presence of a permanent magnet of a rotor of a synchronous machine and comprises processing circuitry 27, a storage medium 29 operatively connected to the processing circuitry 27, and an input unit 31 configured to receive measurement values of phase currents of stator windings and to provide these to the processing circuitry 27.

It should be noted that the permanent magnet detector and the electrical rotor position determination system may be the same system, i.e. the electrical rotor position determination system may also include the permanent magnet detector described below. Alternatively, the permanent magnet detector may be a system that is separate from the electrical rotor position determination system.

The processing circuitry 27 uses any combination of one or more of a suitable central processing unit (CPU), multi-processor, microcontroller, digital signal processor (DSP), application specific integrated circuit (ASIC), field programmable gate arrays (FPGA) etc., capable of executing any herein disclosed operations concerning permanent magnet detection and permanent magnet polarity determination.

The storage medium 29 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. The storage medium 29 comprises computer-executable components which when run on the processing circuitry 27 causes permanent magnet detector 26 to perform the steps of the method of detecting the presence of a permanent magnet as disclosed herein.

Figure 6:
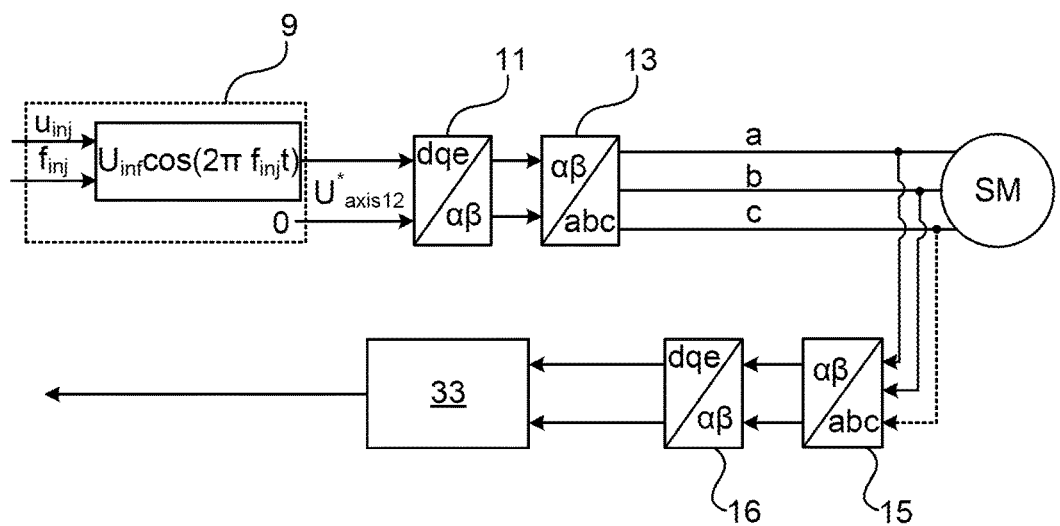
FIG. 6 is a block diagram of various blocks that may be implemented by a permanent magnet detector for detecting the presence of a permanent magnet and to determine the polarity of the permanent magnet.

FIG. 6 shows a block diagram which illustrates examples of logical blocks of the permanent magnet detector 26 that can be used to detect whether the synchronous machine has a permanent magnet, and in case it is determined that a permanent magnet is present, to determine the polarity of the permanent magnet. Any computational blocks in FIG. 6 are realised by means of the processing circuitry 27 of the permanent magnet detector 26.

According to the example in FIG. 6, the voltage reference block 9 is configured to generate a pulsating waveform having a frequency $\omega_{inj}$ and an amplitude $U_{inj}$ in a rotor reference frame, for example the estimated rotor reference frame 25 which after the procedure described above has axis 1 and axis 2 coinciding with the axes of the actual rotor reference frame 23. Typically the pulsating waveform is sinusoidal. The voltage reference block 9 is configured to generate the pulsating waveform in a first direction along an axis of highest reluctance, i.e. lowest inductance, in a rotor reference frame. The rotor reference frame is for example in the direct-quadrature (d, q) coordinate system.

As previously noted, the highest reluctance path, which coincides with an axis of highest reluctance of the actual rotor reference frame 23, may for example have been determined by means of the method previously described herein, or by any other method.

The pulsating waveform is transformed by a first transformation block 11 from the rotor reference frame to a stator reference frame, which is a quadrature reference system fixed to the stator of the synchronous machine SM.

In a second transformation block 13 the rotating sinusoidal waveform obtained from the first transformation block 11 is transformed to a three-phase reference frame. A sinusoidal waveform based on the pulsating sinusoidal waveform generated by voltage reference block 9 is thus applied to the stator windings of the synchronous machine SM. This sinusoidal waveform is typically applied by means of an inverter, connected between the second transformation block 13 and the synchronous machine SM, not shown in FIG. 6.

A third transformation block 15 is configured to transform two phase currents measured in the stator windings from the three-phase reference frame to the stator reference frame. A fourth transformation block 16 is configured to transform the stator reference frame current components to the rotor reference frame. Here, the current in the rotor reference frame, referred to as a current waveform, will normally be along the axis of highest reluctance, due to the standstill condition of the rotor of the synchronous machine SM while the method is being performed.

The permanent magnet detector 26 also comprises a permanent magnet detection and polarity detection block 33, which receives the current waveform to perform a frequency analysis thereof to determine whether a permanent magnet is present in the synchronous machine. In case the presence of a permanent magnet is detected, the permanent magnet detection and polarity detection block 33 is configured to determine the polarity of the permanent magnet, as will be described in more detail in the following.

Figure 7:
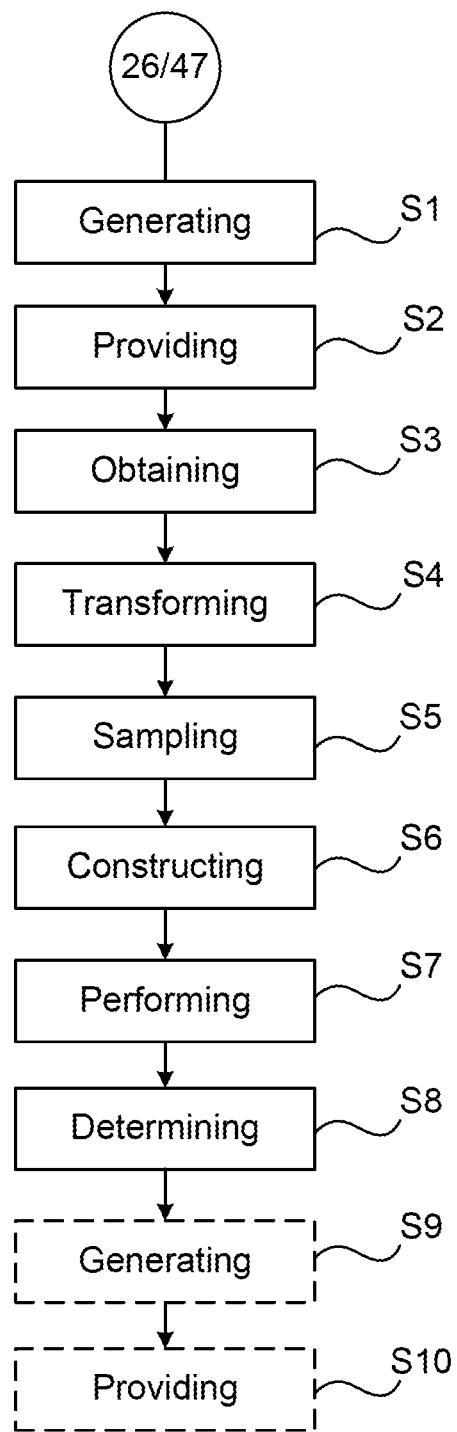
FIG. 7 is a flowchart of a method of detecting the presence of a permanent magnet of a rotor of a synchronous machine.

The permanent magnet detector 26 is configured to perform steps S1-S8 as described in the following and presented in FIG. 7, to determine the presence of a permanent magnet.

In a step S1 a pulsating voltage waveform in a first direction along an axis of highest reluctance in a rotor reference frame is generated. The pulsating voltage waveform is typically a sinusoidal voltage waveform. Although the voltage waveform is pulsating in the axis of highest reluctance, i.e. shifts direction between positive and negative, with "first direction" is here meant the initial direction, i.e. of the first half cycle of the pulsating voltage waveform, which may either be positive or negative.

In a step S2 there is provided an injection of a voltage waveform, based on the pulsating waveform in the first direction along the axis of highest reluctance, applied to the stator windings of the synchronous machine SM.

In a step S3 a measurement of two phase currents in the stator winding generated due to the injection of the voltage waveform is obtained.

In a step S4 the two phase currents are transformed to the rotor reference frame to obtain a current waveform in the rotor reference frame. As described above, this transformation includes a transformation to the stator reference frame and further to the rotor reference frame by means of the third transformation block 15 and the fourth transformation block 16, implemented by the processing circuitry 27.

The pulsating voltage waveform generated in step S1 preferably has a frequency and amplitude which causes saturation in an iron core of the synchronous machine. In this manner, the phase currents measured in step S3 and the corresponding current waveform obtained in step S4 will be distorted, i.e. comprise higher harmonics compared to the injection of the voltage waveform which typically is sinusoidal, as applied to the stator winding in step S2.

In a step S5 the positive portion of a cycle of the current waveform is sampled to obtain sampled positive portion values, and the negative portion of a cycle of the current waveform is sampled to obtain sampled negative portion values.

Figure 8:
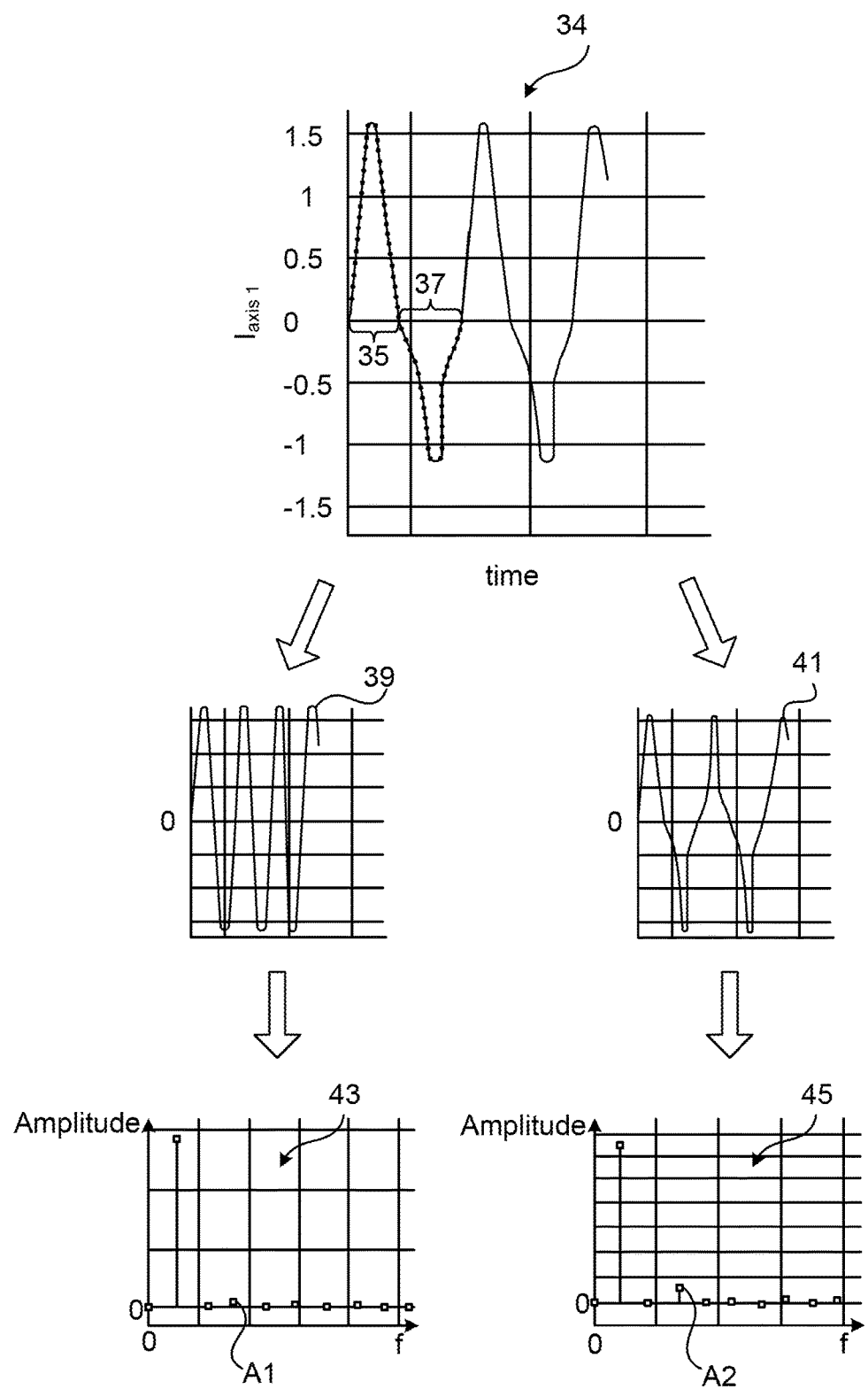
FIG. 8 shows a current waveform in the rotor reference frame, the construction of two periodic waveforms and their respective frequency spectrum.

The sample points of the positive portion 35 of a cycle of the current waveform 34, and the sample points of the negative portion 37 of a cycle of the current waveform are shown in FIG. 8.

In a step S6 a first periodic waveform 39, as shown in FIG. 8, is constructed by using the sampled positive portion values and a second periodic waveform 41 is constructed by using the sampled negative portion values.

The first periodic waveform 39 may be constructed by changing the signs of the positive portion values to obtain the negative portion of a cycle of the first periodic waveform 39. The positive portion and the negative portion of a cycle of the first periodic waveform 39 hence have the same shape; they are mirror images. The second periodic waveform 41 may be constructed by changing the signs of the negative portion values to obtain the positive portion of a cycle of the second periodic waveform 41. The positive portion and negative portion of a cycle of the second periodic waveform 41 hence have the same shape; they are mirror images.

In a step S7 a frequency analysis of the spectrum of the first periodic waveform and of the spectrum of the second periodic waveform is performed. In particular, a first spectrum 43, which is the spectrum of the first periodic waveform 39, is analysed, and a second spectrum 45, which is the spectrum of the second periodic waveform 41, is analysed. For this purpose filtering methods or a frequency domain analysis tool such as the Fourier transform, e.g. a Discrete Fourier Transforms (DFT), for example Fast Fourier Transform (FFT), may be used.

In a step S8 it is determined whether a permanent magnet is present in the synchronous machine based on the first spectrum 43 and on the second spectrum 45.

In step S8, the determination is based on an amount of harmonic distortion of the first periodic waveform 39 obtained using the first spectrum 43 and the amount of harmonic distortion of the second periodic waveform 41 obtained using the second spectrum 45. In particular, as an example, a first amplitude A1 of a specific higher harmonic of the first periodic waveform 39 may be divided by the amplitude of the fundamental of the first periodic waveform 39, and a second amplitude A2 of the same specific higher harmonic of the second periodic waveform 41 may be divided by the amplitude of the fundamental of the second periodic waveform 41, providing a measure of the harmonic distortion of the first periodic waveform 39 and of the second periodic waveform 41. The harmonic distortion HD of any of the first periodic waveform 39 and the second periodic waveform 41 may be calculated by the following formula, which is called total harmonic distortion:

$$HD = \frac{\sqrt{H_2^2 + H_3^2 + H_4^2 + \ldots}}{H_1},$$

where $H_n$ is the amplitude of the n:th harmonic, and where n=1 is the fundamental. It should be noted that generally, because the first periodic waveform 39 and the second periodic waveform 41 are odd functions, only the odd harmonics are included in their respective spectrum, namely the first spectrum 43 and the second spectrum 45, and therefore only the odd harmonics will be included in the denominator. It has furthermore been shown that, as indicated above, it normally suffices to make the calculation of the harmonic distortion by using only the amplitude of the third harmonic of each of the first periodic waveform 39 and the second periodic waveform 41, in which case the harmonic distortion for each of the first periodic waveform 39 and the second periodic waveform 41 is $H_3/H_1$, i.e. the harmonic distortion of the first periodic waveform 39 is equal to the ratio between the amplitude of the third harmonic of the first periodic waveform 39 and the amplitude of the fundamental of the first periodic waveform 39. The same applies for the second periodic waveform 41.

In case the harmonic distortion of both the first periodic waveform 39 and the second periodic waveform 41 are the same or essentially the same, it is in step S8 determined that no permanent magnet is present in the rotor of the synchronous machine.

In case the harmonic distortion is higher for one of the first periodic waveform 39 and the second periodic waveform 41, this indicates the presence of a permanent magnet.

In case the first periodic waveform 39 has a harmonic distortion that is higher than the harmonic distortion of the second periodic waveform 41, it is determined that the north pole of the permanent magnet is in the first direction of the axis of highest reluctance, i.e. in the direction of axis 1 shown in FIG. 3 when considering the method of determining the electric rotor position.

In case the harmonic distortion of the second periodic waveform 41 is higher than the harmonic distortion of the first periodic waveform 39, it is determined that the north pole of the permanent magnet is in a direction opposite to the first direction, in FIG. 3 in the negative direction of axis 1.

In the following, a synchronous machine identifier, and a method of identifying the type of synchronous machine will be described. Here, three main classes of synchronous machines may be identified, namely 1) Surface Permanent Magnet Synchronous Machines (SPMSM), 2) Interior Permanent Magnet Synchronous Machines (IPMSM), and 3) Synchronous Reluctance Machine (SynRM). Class 2) may be subdivided into types 2A) classic IPMSM and 2B) Permanent Magnet assisted Reluctance Machine (PMaSynRM). These may also be identified by means of the hereinafter described synchronous machine identifier and method.

The synchronous machine identifier and corresponding method may according to one variation rely on the previously described method of determining the orientation of highest reluctance path and the polarity of a permanent magnet. Alternatively, this method may be performed separately from the previously two described methods.

Figure 9:
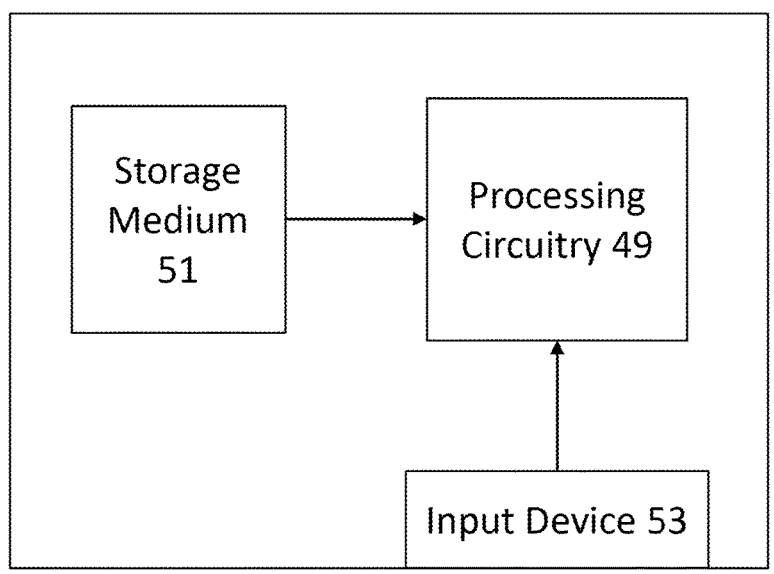
FIG. 9 depicts a block diagram of an example of a synchronous machine type identifier.

With reference to FIG. 9, an example of a synchronous machine type identifier is shown. Synchronous machine type identifier 47 is configured to identify the type of a synchronous machine and comprises processing circuitry 49, a storage medium 51 operatively connected to the processing circuitry 49, and an input unit 53 configured to receive measurement values of phase currents of stator windings and to provide these to the processing circuitry 49.

It should be noted that the synchronous machine type identifier 47 and the permanent magnet detector 26 may be the same system, i.e. the permanent magnet detector 26 may also include the synchronous machine type identifier described below. The synchronous machine type identifier 47 may according to one variation also be the same system as the electrical rotor position determination system 1. Alternatively, the synchronous machine type identifier may be a system that is separate from the electrical rotor position determination system 1 and the permanent magnet detector 26.

The synchronous machine type identifier 47 may be configured to perform steps S1-S8 described above, which therefore will not be described again. As previously described, in step S8, it is determined whether a permanent magnet is present or not. In case no permanent magnet has been detected in step S8, it is determined that the synchronous machine SM is a Synchronous Reluctance Machine. In this case, the method has reached an end.

In case that it is determined in step S8 that a permanent magnet is present, the synchronous machine type identifier 47 is configured to identify the type of the synchronous machine.

In order to determine whether the synchronous machine is of class 1) or 2) in a step S9 a pulsating voltage waveform in a direction orthogonal to the axis of highest reluctance is generated. In this case the pulsating voltage waveform is instead of along axis 1 injected along axis 2 of estimated rotor reference frame 25, which is aligned with the actual rotor reference frame 23. In a step S10 there is provided an injection of a voltage waveform, based on the pulsating waveform in the direction orthogonal to the axis of highest reluctance, applied to the stator windings of the synchronous machine SM. Again, the pulsating voltage waveform generated in step S9 preferably has a frequency and amplitude which causes saturation in an iron core of the synchronous machine, i.e. the fundamental harmonic component of the current waveform 34 in the estimated rotor reference frame is close to or equal to nominal motor current.

If the voltage source converter which is configured to inject the voltage waveform becomes saturated because the target current waveform in axis 2 is not reachable, or if saturation of the voltage source converter is not reached but the ratio between the amplitude of the voltage waveform previously injected along axis 1 in step S2 and the amplitude of the injected voltage waveform along axis 2 substantially differs from 1, for example by 15%, it is determined that the synchronous machine is of type 2), i.e. an IPMSM. Note that here, it has not yet been determined whether the IPMSM is of type 2A) or 2B) defined above. If on the other hand the ratio between the amplitude of the voltage waveform previously injected along axis 1 in step S2 and the amplitude of the injected voltage waveform along axis 2 is about 1, it is determined that the synchronous machine is of class 1), i.e. an SPMSM.

In case it has been determined that the synchronous machine is an IPMSM, it is determined whether the IPMSM is of type 2A) or 2B). Hereto, while steps S1-S8 are carried out the, the positive peak value and the negative peak value of the current waveform 34 obtained in step S4 may be determined and stored in the storage medium 51.

The synchronous machine type identifier 47 is configured to compare the absolute value of the negative peak value with the positive peak value, and to analyse the polarity of the permanent magnet to determine whether the IPMSM is of type 2A) or 2B).

In case the positive peak value is greater than the absolute value of the negative peak value, and it is determined that the north pole of the permanent magnet is in the first direction, it is defined that the first direction along axis 1 is the positive d-axis in the actual rotor reference frame. If it instead is determined that the absolute value of the negative peak value is greater than the positive peak value, and it is determined that the north pole of the permanent magnet is in a direction opposite to the first direction, it is defined that the first direction along axis 1 is the negative d-axis in the actual rotor reference frame. In both cases it is determined that the synchronous machine is a classic IPMSM.

If the positive peak value is greater than the absolute value of the negative peak value, and it is determined that the north pole of the permanent magnet is in a direction opposite to the first direction, it is defined that the first direction along axis 1 is the positive q-axis in the actual rotor reference frame. If it instead is determined that the absolute value of the negative peak value is greater than the positive peak value, and it is determined that the north pole of the permanent magnet is in the first direction, it is defined that the first direction along axis 1 is the negative q-axis in the actual rotor reference frame. In both cases it is determined that the synchronous machine is a PMaSynRM.

It shall be noted that the method carried out by the synchronous machine type identifier 47 does not necessarily have to include steps S1-S8. For example, in case the axis of highest reluctance is known, and the polarity of the permanent magnet is known, and if the positive peak value and the negative peak value of the current waveform 34 are previously known, it suffices to generate and inject the voltage waveform in axis 2 according to steps S9 and S10 and to perform the comparison of the positive and negative peak values in conjunction with the permanent magnet polarity analysis to determine whether the IPMSM is of classic type or PMaSynRM type.

The inventive concept has mainly been described above with reference to a few examples. However, as is readily appreciated by a person skilled in the art, other embodiments than the ones disclosed above are equally possible within the scope of the inventive concept, as defined by the appended claims.

What is claimed is:

1. A method of detecting the presence of a permanent magnet of a rotor of a synchronous machine, wherein the method comprises:
    providing an injection of a voltage waveform to the stator windings of the synchronous machine,
    obtaining a measurement of two phase currents in the stator winding generated due to the injection of the voltage waveform,
    transforming the two phase currents to a rotor reference frame to obtain a current waveform in the rotor reference frame,
    sampling the positive portion of a cycle of the current waveform to obtain sampled positive portion values and the negative portion of a cycle of the current waveform to obtain sampled negative portion values,
    constructing a first periodic waveform by using the sampled positive portion values and a second periodic waveform by using the sampled negative portion values,
    performing a frequency analysis of first spectrum of the first periodic waveform and of a second spectrum of the second periodic waveform, and
    determining whether a permanent magnet is present in the synchronous machine based on the first spectrum and on the second spectrum.

2. The method according to claim 1, wherein the step of determining is based on a harmonic distortion of the first periodic waveform obtained from the first spectrum and on a harmonic distortion of the second periodic waveform obtained from the second spectrum.

3. The method according to claim 2, wherein in case the harmonic distortion of the first periodic waveform and of the second periodic waveform is the same, it is determined that no permanent magnet is present in the rotor of the synchronous machine.

4. The method according to claim 2, wherein in case the harmonic distortion of the first periodic waveform is higher than the harmonic distortion of the second periodic waveform, it is determined that the rotor of the synchronous machine has a permanent magnet and that the north pole of the permanent magnet is in the first direction.

5. The method according to claim 2, wherein in case the harmonic distortion of the second periodic waveform is higher than the harmonic distortion of the first periodic waveform, it is determined that the rotor of the synchronous machine has a permanent magnet and that the north pole of the permanent magnet is in a direction opposite to the first direction.

6. The method according to claim 1, wherein the pulsating voltage waveform has a frequency and amplitude which causes saturation in an iron core of the synchronous machine.

7. The method according to claim 2, wherein the higher harmonic is the third harmonic.

8. The method according to claim 1, including generating a pulsating voltage waveform in a first direction along an axis of highest reluctance in a rotor reference frame, wherein in step the voltage waveform is based on the pulsating voltage waveform.

9. A non-transitory computer-executable medium storing instructions, which when executed by processing circuitry of a permanent magnet detector causes the permanent magnet detector to perform the method according to claim 1.

10. A permanent magnet detector for detecting the presence of a permanent magnet of a rotor of a synchronous machine, the permanent magnet detector comprising:
    processing circuitry, and
    a storage medium having computer-executable instructions which when run on the processing circuitry causes the permanent magnet detector to:
    provide an injection of a voltage waveform to the stator windings of the synchronous machine,
    obtain a measurement of two phase currents in the stator winding generated due to the injection of the voltage waveform,
    transform the two phase currents to the rotor reference frame to obtain a current waveform in a rotor reference frame,
    sample the positive portion of a cycle of the current waveform to obtain sampled positive portion values and the negative portion of a cycle of the current waveform to obtain sampled negative portion values,
    construct a first periodic waveform by using the sampled positive portion values and a second periodic waveform by using the sampled negative portion values,
    perform a frequency analysis of a first spectrum of the first periodic waveform and of second spectrum of the second periodic waveform, and
    determine whether a permanent magnet is present in the synchronous machine based on the first spectrum and on the second spectrum.

11. The permanent magnet detector according to claim 10, wherein the permanent magnet detector is configured to determine whether a permanent magnet is present in the synchronous machine based on a harmonic distortion of the first periodic waveform obtained from the first spectrum and on a harmonic distortion of the second periodic waveform obtained from the second spectrum.

12. The permanent magnet detector according to claim 11, wherein the permanent magnet detector is configured to determine that no permanent magnet is present in the rotor of the synchronous machine in case the harmonic distortion of the first periodic waveform and of the second periodic waveform is the same.

13. The permanent magnet detector according to claim 11, wherein the permanent magnet detector is configured to determine that the rotor of the synchronous machine has a permanent magnet and that the north pole of the permanent magnet is in the first direction in case the harmonic distortion of the first periodic waveform is higher than the harmonic distortion of the second periodic waveform.

14. The permanent magnet detector according to claim 11, wherein the permanent magnet detector is configured to determine that the rotor of the synchronous machine has a permanent magnet and that the north pole of the permanent magnet is in a direction opposite to the first direction in case the harmonic distortion of the second periodic waveform is higher than the harmonic distortion of the first periodic waveform.

15. The permanent magnet detector according to claim 10, wherein the permanent magnet detector is configured to generate a voltage waveform that has a frequency and amplitude which causes saturation in an iron core of the synchronous machine.

16. The permanent magnet detector according to claim 11, wherein the higher harmonic is the third harmonic.

17. The permanent magnet detector according to claim 10, wherein the permanent magnet detector is configured to generate a pulsating voltage waveform in a first direction along an axis of highest reluctance in a rotor reference frame, wherein the permanent magnet detector is configured inject the voltage waveform to the stator windings of the synchronous machine based on the pulsating voltage waveform.

18. The method according to claim 3, wherein in case the harmonic distortion of the first periodic waveform is higher than the harmonic distortion of the second periodic waveform, it is determined that the rotor of the synchronous machine has a permanent magnet and that the north pole of the permanent magnet is in the first direction.

19. The permanent magnet detector according to claim 12, wherein the permanent magnet detector is configured to determine that the rotor of the synchronous machine has a permanent magnet and that the north pole of the permanent magnet is in the first direction in case the harmonic distortion of the first periodic waveform is higher than the harmonic distortion of the second periodic waveform.

* * * * *